(12) United States Patent
Beyers et al.

(10) Patent No.: US 9,359,526 B2
(45) Date of Patent: Jun. 7, 2016

(54) BIODISINTEGRATABLE COMPOSITE FOILS

(71) Applicant: BASF SE, Ludwigshafen (DE)

(72) Inventors: Cornelis Petrus Beyers, Altrip (DE);
Heiko Diehl, Mannheim (DE); Stefan Dahmen, Freinsheim (DE); Volker Kriegisch, Schonungen (DE); Ulrike Licht, Mannheim (DE); Axel Meyer, Heidelberg (DE); Motonori Yamamoto, Mannheim (DE)

(73) Assignee: BASF SE, Ludwigshafen (DE)

( * ) Notice: Subject to any disclaimer, the term of this patent is extended or adjusted under 35 U.S.C. 154(b) by 35 days.

(21) Appl. No.: 14/540,468

(22) Filed: Nov. 13, 2014

(65) Prior Publication Data
US 2015/0072153 A1    Mar. 12, 2015

Related U.S. Application Data

(62) Division of application No. 13/191,982, filed on Jul. 27, 2011, now Pat. No. 8,956,497.

(60) Provisional application No. 61/368,665, filed on Jul. 29, 2010.

(51) Int. Cl.
| C09D 175/06 | (2006.01) |
| B32B 37/12  | (2006.01) |
| B32B 37/14  | (2006.01) |
| C08G 18/66  | (2006.01) |
| C08G 18/79  | (2006.01) |
| C08G 18/08  | (2006.01) |
| C08G 18/10  | (2006.01) |
| C08G 18/12  | (2006.01) |
| C08G 18/42  | (2006.01) |
| C09J 175/06 | (2006.01) |

(52) U.S. Cl.
CPC .............. *C09D 175/06* (2013.01); *B32B 37/12* (2013.01); *B32B 37/14* (2013.01); *C08G 18/0823* (2013.01); *C08G 18/10* (2013.01); *C08G 18/12* (2013.01); *C08G 18/4216* (2013.01); *C08G 18/4238* (2013.01); *C08G 18/6659* (2013.01); *C08G 18/792* (2013.01); *C09J 175/06* (2013.01); *B32B 2037/148* (2013.01); *B32B 2307/7163* (2013.01); *B32B 2317/12* (2013.01); *B32B 2553/00* (2013.01); *C08G 2170/80* (2013.01); *C08G 2230/00* (2013.01); *Y10T 428/31551* (2015.04)

(58) Field of Classification Search
CPC .................................................. C09D 175/06
USPC ........................................ 428/423.1; 156/331.7
See application file for complete search history.

(56) References Cited

U.S. PATENT DOCUMENTS

| 3,412,054 A | 11/1968 | Milligan et al. |
| 3,905,929 A | 9/1975 | Noll |
| 3,920,598 A | 11/1975 | Reiff et al. |
| 4,192,937 A | 3/1980 | Noll et al. |
| 4,269,748 A | 5/1981 | Nachtkamp et al. |
| 4,292,226 A | 9/1981 | Wenzel et al. |
| 5,834,554 A | 11/1998 | Duan et al. |
| 2003/0225239 A1 | 12/2003 | Nakamura et al. |
| 2007/0148445 A1* | 6/2007 | Licht .............. C08G 18/0823 428/355 EP |
| 2009/0056873 A1 | 3/2009 | Schumacher et al. |
| 2010/0004386 A1 | 1/2010 | Nishino |

FOREIGN PATENT DOCUMENTS

| CA | 1 129 128 | 8/1982 |
| CA | 2261977 | 2/1998 |
| CN | 1226266 A | 8/1999 |
| DE | 1 495 745 | 6/1969 |
| DE | 2 034 479 | 1/1972 |
| DE | 39 11 827 A1 | 10/1990 |
| JP | 9-324169 A | 12/1997 |
| JP | 2004-43519 A | 2/2004 |
| JP | 2005-76013 A | 3/2005 |
| JP | 2009-523875 A | 6/2009 |
| WO | WO 96/35733 A1 | 11/1996 |
| WO | WO 2008/120688 A1 | 10/2008 |
| WO | WO 2010/034712 A1 | 4/2010 |
| WO | WO2012/013506 A1 | 2/2012 |

OTHER PUBLICATIONS

Office Action issued Mar. 2, 2015 in Japanese Patent Application No. 2013-521054 (submiting English translation only).
English translation of Chinese Office Action issued Feb. 8, 2014, in copending Chinese Patent Application No. 2011800373285, 5 pages.

* cited by examiner

*Primary Examiner* — Daniel Lee
(74) *Attorney, Agent, or Firm* — Oblon, McClelland, Maier & Neustadt, L.L.P.

(57) ABSTRACT

The use of an aqueous polyurethane dispersion adhesive is described for producing biodisintegratable composite foils where at least two substrates are adhesive-bonded to one another with use of the polyurethane dispersion adhesive, where at least one of the substrates is a biodisintegrable polymer foil. At least 60% by weight of the polyurethane is composed of diisocyanates, polyesterdiols, and at least one bifunctional carboxylic acid selected from dihydroxycarboxylic acids and diaminocarboxylic acids.

16 Claims, No Drawings

BIODISINTEGRATABLE COMPOSITE FOILS

CROSS REFERENCE TO RELATED APPLICATIONS

The present application is a divisional of U.S. patent application Ser. No. 13/191,982, filed on Jul. 27, 2011, the text of which is incorporated by reference, which claims priority to U.S. Provisional Application No. 61/368,665, filed on Jul. 29, 2010, the text of which is incorporated by reference.

The invention relates to the use of an aqueous polyurethane dispersion adhesive for producing biodisintegratable composite foils. The invention also relates to a process for producing the composite foils and to the composite foils produced by the process.

Flexible packaging is often composed of composite foils adhesive-bonded to one another by a suitable adhesive, where at least one of the foils bonded to one another is a polymer foil. There is high demand for degradable composite-foil packaging, where the term degradable materials is also understood to include materials that decompose under biological conditions, i.e. disintegrating or compostable materials.

The major challenge consists in providing materials which have the necessary functionality and stability but which when subject to stimulation from a bioactive environment, are degraded or decomposed with maximum rapidity and to maximum extent. The trigger for the degradation process can be microbiological, hydrolytic, or oxidative degradation at a specific site within the main chain of a polymer. All of the degradation products should exhibit maximum safety and minimum toxicity and not be capable of accumulation within the natural environment, and this means that they should be subject to complete and final microbial degradation. The adhesive used for the adhesive-bonding of the foils also has an effect on biodisintegratability. The adhesive is intended firstly to provide a stable adhesive bond but secondly also to promote degradability, i.e. disintegration of the foil composite. It is extremely difficult to achieve simultaneous compliance with, and optimization of, these fundamentally contradictory requirements.

WO 96/35733 discloses degradable and compostable moldings inclusive of sheet-like structures. They are produced by using aqueous dispersions of polyurethanes having urea groups. The polyurethanes are composed of a diisocyanate component, a diol component, a diamine component in the form of diaminosulfonates, and optionally hydrophilic polyether alcohols.

Some aspects of biodisintegratability remain unsatisfactory. The object consisted in providing further materials for degradable and, respectively disintegratable composite foils, in particular for flexible packaging, where these can be produced with maximum ease and have maximum quality of adhesive properties, and also simultaneously have maximum quality of biodisintegratability.

It has been found that the object can be achieved via use of the polyurethane adhesive dispersions described below. The invention provides the use of an aqueous polyurethane dispersion adhesive for producing biodisintegratable composite foils, where at least one first substrate is adhesive-bonded to at least one second substrate with use of the polyurethane dispersion adhesive, where at least one of the substrates is a biodisintegratable polymer foil, and where at least 60% by weight of the polyurethane is composed of
  (a) diisocyanates,
  (b) polyesterdiols, and
  (c) at least one bifunctional carboxylic acid selected from dihydroxycarboxylic acids and diaminocarboxylic acids.

The invention also provides a process for producing composite foils, which comprises providing an aqueous polyurethane dispersion adhesive based on the polyurethanes to be used in the invention, and adhesive-bonding at least two substrates to one another with use of the aqueous polyurethane dispersion adhesive, where at least one of the substrates is a biodisintegratable polymer foil. The invention also provides composite foils produced by the process of the invention.

For the purposes of this application, a material has biodisintegratability if, for example, at most 10% of the original dry weight of the test material are found to be present after aerobic composting for a period of at most 12 weeks in a sieve fraction >2 mm, where the measurement is made in accordance with the standard EN 13432 (2000).

The adhesive to be used in the invention consists essentially of at least one polyurethane dispersed in water as polymeric binder, and optionally of added substances, such as fillers, thickeners, antifoam, etc. The polymeric binder preferably takes the form of dispersion in water or else in a mixture made of water and of water-soluble organic solvents with boiling points which are preferably below 150° C. (1 bar). Particular preference is given to water as sole solvent. The water or other solvents are not included in the calculation of weight data relating to the constitution of the adhesive.

The polyurethane dispersion adhesive is preferably biodegradable. For the purposes of this application, a material is biodisintegratable if, after 20 days, for example, the ratio of gaseous carbon liberated in the form of $CO_2$ to total carbon content of the material used is at least 30%, preferably at least 60%, or at least 80%, measured in accordance with standard ISO 14855 (2005).

The polyurethanes are preferably mainly composed of polyisocyanates, in particular diisocyanates, on the one hand, and on the other hand of reactants which are polyesterdiols, and also bifunctional carboxylic acids. It is preferable that the polyurethane is composed of at least 40% by weight, particularly at least 60% by weight, and very particularly at least 80% by weight, of diisocyanates, polyesterdiols, and bifunctional carboxylic acids.

The polyurethane can be amorphous or semicrystalline. If the polyurethane is semicrystalline, the melting point is preferably below 80° C. To this end, it is preferable that the polyurethane comprises an amount of more than 10% by weight, more than 50% by weight, or at least 80% by weight, based on the polyurethane, of polyesterdiols.

The entire polyurethane is preferably composed of:
  a) diisocyanates,
  b) diols, where, of these,
    $b_1$) from 10 to 100 mol %, based on the total amount of the diols (b), are polyesterdiols with a molar mass of from 500 to 5000 g/mol,
    $b_2$) from 0 to 90 mol %, based on the total amount of the diols (b), have a molar mass of from 60 to 500 g/mol,
  c) at least one bifunctional carboxylic acid selected from dihydroxycarboxylic acids and diaminocarboxylic acids,
  d) optionally other polyfunctional compounds which differ from the monomers (a) to (c) and which have reactive groups, where these are alcoholic hydroxy groups, primary or secondary amino groups, or isocyanate groups, and
  e) optionally monofunctional compounds which differ from the monomers (a) to (d) and which have a reactive group which is an alcoholic hydroxy group, a primary or secondary amino group, or an isocyanate group.

Monomers (a) that should particularly be mentioned are diisocyanates $X(NCO)_2$, where X is an aliphatic hydrocarbon radical having from 4 to 15 carbon atoms, a cycloaliphatic or aromatic hydrocarbon radical having from 6 to 15 carbon atoms, or an araliphatic hydrocarbon radical having from 7 to 15 carbon atoms. Examples of these diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanato-benzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI), e.g. the trans/trans, the cis/cis, and the cis/trans isomers, and also mixtures composed of said compounds. Diisocyanates of this type are available commercially. Important mixtures of said isocyanates are particularly the mixtures of the respective structural isomers of diisocyanatotoluene and diisocyanatodiphenylmethane, and a particularly suitable mixture is made of 80 mol % of 2,4-diisocyanatotoluene and 20 mol % of 2,6-diisocyanatotoluene. The mixtures of aromatic isocyanates such as 2,4-diisocyanatotoluene and/or 2,6-diisocyanatotoluene with aliphatic or cycloaliphatic isocyanates such as hexamethylene diisocyanate or IPDI are also particularly advantageous, where the preferred mixing ratio of the aliphatic to aromatic isocyanates is from 4:1 to 1:4. Other than the abovementioned compounds, other compounds that can be used in the structure of the polyurethanes are those which have, alongside the free isocyanate groups, other capped isocyanate groups, e.g. uretdione groups.

With a view to good film-formation and elasticity, diols (b) that can be used are mainly relatively high-molecular-weight diols (b1) which have a molar mass of about 500 to 5000 g/mol, preferably about 1000 to 3000 g/mol. This is the number-average molar mass Mn. Mn is calculated by determining the number of terminal groups (OH number). The diols (b1) can be polyester polyols, where these are known by way of example from Ullmanns Enzyklopädie der technischen Chemie [Ullmann's encyclopedia of industrial chemistry], 4$^{th}$ edition, volume 19, pp. 62 to 65. It is preferable to use polyester polyols which are obtained via reaction of difunctional alcohols with difunctional carboxylic acids. Instead of the free polycarboxylic acids, it is also possible to use the corresponding polycarboxylic anhydrides or corresponding polycarboxylic esters of lower alcohols, or a mixture of these, to produce the polyester polyols. The polycarboxylic acids can be aliphatic, cycloaliphatic, araliphatic, aromatic, or heterocyclic, and can optionally have unsaturation and/or substitution, e.g. by halogen atoms. Examples that may be mentioned of these are: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, and dimeric fatty acids. Preference is given to dicarboxylic acids of the general formula HOOC—$(CH_2)_y$—COOH, where y is a number from 1 to 20, preferably an even number from 2 to 20, examples being succinic acid, adipic acid, sebacic acid, and dodecanedicarboxylic acid.

Examples of polyfunctional alcohols that can be used are ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes, such as 1,4-bis(hydroxymethyl)cyclohexane, 2-methyl-propane-1,3-diol, methylpentanediols, and also diethylene glycol, triethylene glycol, tetraethylene glycol, polyethylene glycol, dipropylene glycol, polypropylene glycol, dibutylene glycol, and polybutylene glycols. Preference is given to alcohols of the general formula HO—$(CH_2)_x$—OH, where x is a number from 1 to 20, preferably an even number from 2 to 20. Examples here are ethylene glycol, butane-1,4-diol, hexane-1,6-diol, octane-1,8-diol, and dodecane-1,12-diol. Preference is further given to neopentyl glycol.

It is optionally also possible to use polycarbonatediols as by way of example are obtainable via reaction of phosgene with an excess of the low-molecular-weight alcohols mentioned as structural components for the polyester polyols.

It is also possible to use lactone-based polyesterdiols, alone or in combination with the abovementioned polyesterdiols, where these are homo- or copolymers of lactones, preferably adducts which have terminal hydroxy groups and which are produced by addition reactions of lactones onto suitable difunctional starter molecules. Preferred lactones that can be used are those deriving from compounds of the general formula HO—$(CH_2)_z$—COOH, where z is a number from 1 to 20 and an H atom of a methylene unit can also have been replaced by a $C_1$-$C_4$-alkyl radical. Examples are epsilon-caprolactone, β-propiolactone, gamma-butyrolactone, and/or methyl-epsilon-caprolactone, and also mixtures of these. Examples of suitable starter components are the low-molecular-weight difunctional alcohols mentioned above as structural component for the polyester polyols. Particular preference is given to the corresponding polymers of epsilon-caprolactone. Lower polyesterdiols or polyetherdiols can also be used as starters for producing the lactone polymers. Instead of the polymers of lactones, it is also possible to use the corresponding, chemically equivalent polycondensates of the hydroxycarboxylic acids that correspond to the lactones.

In addition to the polyesterdiols, it is also optionally possible to make concomitant use of polyetherdiols. Polyetherdiols are in particular obtainable via polymerization of ethylene oxide, propylene oxide, butylene oxide, tetrahydrofuran, styrene oxide, or epichlorohydrin with themselves, e.g. in the presence of $BF_3$, or via an addition reaction of said compounds, optionally in a mixture or in succession, onto starter components having reactive hydrogen atoms, e.g. alcohols or amines, examples being water, ethylene glycol, propane-1,2-diol, propane-1,3-diol, 2,2-bis(4-hydroxyphenyl)propane, or aniline. Examples of polyetherdiols are polypropylene oxide and polytetrahydrofuran with molar mass from 240 to 5000 g/mol, and especially from 500 to 4500 g/mol. However, it is preferable that no polyetherdiols are used as structural component for the polyurethanes.

It is also optionally possible to make concomitant use of polyhydroxyolefins, preferably those having 2 terminal hydroxy groups, e.g. α,ω-dihydroxypolybutadiene, α,ω-dihydroxy-polymethacrylate, or α,ω-dihydroxypolyacrylate. Other suitable polyols are polyacetals, polysiloxanes, and alkyd resins.

It is preferable that at least 95 mol % or 100 mol % of the diols $b_1$) are polyesterdiols. It is particularly preferable that diols $b_1$) used comprise exclusively polyesterdiols.

The hardness and the modulus of elasticity of the polyurethanes can be increased if diols (b) used also comprise, alongside the diols ($b_1$), low-molar-mass diols ($b_2$) with molar mass about 60 to 500 g/mol, preferably from 62 to 200 g/mol. Monomers (b2) used are especially the structural components of the short-chain alkanediols mentioned for the production of polyester polyols, where preference is given to the unbranched diols having from 2 to 12 carbon atoms and having an even number of carbon atoms, and also pentane-1,5-diol and neopentyl glycol. Examples of diols $b_2$) that can be used are ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes, such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol, and polybutylene glycols. Preference is given to alcohols of the general formula HO—$(CH_2)_x$—OH, where x is a number from 1 to 20, preferably an even number from 2 to 20. Examples here are ethylene glycol, butane-1,4-diol, hexane-1,6-diol, octane-1,8-diol, and dodecane-1,12-diol. Preference is further given to neopentyl glycol.

It is preferable that the proportion of the diols ($b_1$), based on the total amount of the diols (b), is from 10 to 100 mol % or from 60 to 100 mol %, and that the proportion of the monomers ($b_2$), based on the total amount of the diols (b), is from 0 to 90 mol %, or from 0 to 40 mol %.

In order to achieve the water-dispersibility of the polyurethanes and to improve biodegradability, the polyurethanes comprise at least one bifunctional carboxylic acid selected from dihydroxycarboxylic acids and diaminocarboxylic acids. It is optionally also possible to make additional use of hydrophilic structural components which promote dispersibility and which bear at least one isocyanate group or at least one group reactive toward isocyanate groups, and moreover at least one hydrophilic group, or one group which can be converted to a hydrophilic group. In the text hereinafter, the "hydrophilic groups or potentially hydrophilic groups" is abbreviated to "(potentially) hydrophilic groups". When compared with the functional groups of the monomers that are used to construct the main chain of the polymer, the (potentially) hydrophilic groups are substantially slower to react with isocyanates.

The proportion of the components having (potentially) hydrophilic groups, based on the total amount of components (a) to (f), is generally judged in such a way that the molar amount of the (potentially) hydrophilic groups, based on the total amount of all of the monomers (a) to (f), is from 30 to 1000 mmol/kg, preferably from 50 to 500 mmol/kg, and particularly preferably from 80 to 300 mmol/kg. The (potentially) hydrophilic groups can be nonionic or preferably (potentially) ionic hydrophilic groups. Particular nonionic hydrophilic groups that can be used are in the form of polyethylene glycol ethers preferably made of from 5 to 100 repeat ethylene oxide units, with preference from 10 to 80 repeat ethylene oxide units. The content of polyethylene oxide units is generally from 0 to 10% by weight, preferably from 0 to 6% by weight, based on the total amount of all of the monomers (a) to (f). Examples of monomers having nonionic hydrophilic groups are polyethylene oxide diols using at least 20% by weight of ethylene oxide, polyethylene oxide monools, and also the reaction products of a polyethylene glycol and of a diisocyanate, where these bear an etherified terminal polyethylene glycol radical. Diisocyanates of this type, and also processes for their production, are given in the patent specifications U.S. Pat. No. 3,905,929 and U.S. Pat. No. 3,920,598.

The bifunctional carboxylic acid used usually comprises aliphatic, cycloaliphatic, araliphatic, or aromatic carboxylic acids, where these bear at least two hydroxy groups or two primary or secondary amino groups. Preference is given to dihydroxyalkylcarboxylic acids, especially those having from 3 to 10 carbon atoms, as are also described in U.S. Pat. No. 3,412,054. Particular preference is given to compounds of the general formula ($c_1$)

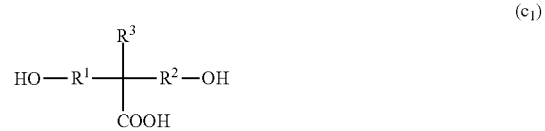

in which $R^1$ and $R^2$ are a $C_1$-$C_4$-alkanediyl (unit), and $R^3$ is a $C_1$-$C_4$-alkyl (unit), and especially to dimethylolpropionic acid (DMPA).

Other suitable compounds are dihydroxy compounds having a molar mass of from above 500 to 10 000 g/mol and having at least 2 carboxylate groups, where these are known from DE-A 3 911 827. They are obtainable via reaction of dihydroxy compounds with tetracarboxylic dianhydrides, such as pyromellitic dianhydride or cyclopentanetetracarboxylic dianhydride, in a molar ratio of from 2:1 to 1.05:1, in a polyaddition reaction. Particularly suitable dihydroxy compounds are the monomers (b2) listed as chain extenders, and also the diols (b1).

Monomers (c) which can be used and which have amino groups reactive toward isocyanates are diaminocarboxylic acids, or the adducts which are mentioned in DE-A 2034479 and which derive from an addition reaction of aliphatic diprimary diamines onto alpha, β-unsaturated carboxylic acids. Compounds of this type comply by way of example with the formula ($c_2$)

$$H_2N—R^4—NH—R^5—X \qquad (c_2)$$

where $R^4$ and $R^5$, independently of one another, are a $C_1$-$C_6$-alkanediyl unit, preferably ethylene, and X is COOH. Particularly preferred compounds of the formula ($c_2$) are N-(2-aminoethyl)-2-aminoethanecarboxylic acid and the corresponding alkali metal salts, where Na is particularly preferred as counterion.

Alongside the bifunctional carboxylic acids, other monomers having hydrophilic groups can optionally also be used, examples being appropriate dihydroxysulfonic acids and dihydroxyphosphonic acids, such as 2,3-dihydroxypropanephosphonic acid, or diaminosulfonic acids. However, it is preferable not to use any bifunctional sulfonic acids or phosphonic acids.

Ionic hydrophilic groups are especially anionic groups such as the sulfonate group, the carboxylate group, and the phosphate group, in the form of their alkali metal salts or ammonium salts, and also cationic groups, such as ammonium groups, in particular protonated tertiary amino groups, or quaternary ammonium groups. Potentially ionic hydrophilic groups are especially those which can be converted into the abovementioned ionic hydrophilic groups via simple neutralization, hydrolysis, or quaternization reactions, therefore being by way of example carboxylic acid groups or tertiary amino groups. (Potentially) ionic monomers are described by way of example in Ullmanns Enzyklopädie der technischen Chemie [Ullmann's encyclopedia of industrial chemistry], 4th edition, volume 19, pp. 311-313, and by way of example in DE-A 1 495 745, in detail.

(Potentially) cationic monomers (c) that are of particular practical importance are especially monomers having tertiary amino groups, examples being: tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, and N-aminoalkyldialkylamines, where the alkyl radicals and alkanediyl units of said tertiary amines are composed independently of one another of from 1 to 6 carbon atoms. Other compounds that can be used are polyethers having tertiary nitrogen atoms and preferably having two terminal hydroxy groups, for example those accessible in a manner which is conventional per se via alkoxylation of amines having two hydrogen atoms bonded to amine nitrogen, e.g. methylamine, aniline, or N,N'-dimethylhydrazine. The molar mass of polyethers of this type is generally from 500 to 6000 g/mol. Said tertiary amines are converted to the ammonium salts either with acids, preferably strong mineral acids, such as phosphoric acid, sulfuric acid, hydrohalic acids, or strong organic acids, or via reaction with suitable quaternizing agents, such as $C_1$-$C_6$-alkyl halides or benzyl halides, e.g. bromides or chlorides.

To the extent that monomers having potentially ionic groups are used, the conversion of these to the ionic form can take place prior to, during, or preferably after the isocyanate polyaddition reaction, since the ionic monomers are often only sparingly soluble in the reaction mixture. It is particularly preferable that the carboxylate groups are present in the form of their salts with an alkali metal ion or ammonium ion as counterion.

The monomers (d) which differ from the monomers (a) to (c) and which optionally are also constituents of the polyurethane are generally used for crosslinking or for chain extension. They are generally nonphenolic alcohols of functionality more than two, amines having 2 or more primary and/or secondary amino groups, or else compounds which have not only one or more alcoholic hydroxy groups but also one or more primary and/or secondary amino groups. Examples of alcohols which have functionality higher than 2 and which can be used to adjust to a certain degree of branching or of crosslinking are trimethylolpropane, glycerol, or sugars. Monoalcohols can also be used where these bear not only the hydroxy group but also another group reactive toward isocyanates, examples being monoalcohols having one or more primary and/or secondary amino groups, e.g. monoethanolamine.

Polyamines having 2 or more primary and/or secondary amino groups are used especially when the chain extension and, respectively, crosslinking reaction is intended to take place in the presence of water, since the speed of reaction of amines with isocyanates is generally greater than that of alcohols or water. This is frequently a requirement when aqueous dispersions of crosslinked polyurethanes or polyurethanes with high molecular weight are desired. In such cases, the procedure is to produce prepolymers having isocyanate groups, to disperse these rapidly in water, and then to subject them to chain-extension or crosslinking via addition of compounds having a plurality of amino groups reactive toward isocyanates. Amines suitable for this purpose are generally polyfunctional amines in the molar-mass range from 32 to 500 g/mol, preferably from 60 to 300 g/mol, where these comprise at least two amino groups selected from the group of the primary and secondary amino groups. Examples here are diamines, such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate, or triamines, such as diethylenetriamine or 1,8-diamino-4-aminomethyloctane.

The amines can also be used in capped form, e.g. in the form of the corresponding ketimines (see, for example, CA-A 1 129 128), ketazines (cf., for example, U.S. Pat. No. 4,269,748), or amine salts (see U.S. Pat. No. 4,292,226). Oxazolidines, for example those used in U.S. Pat. No. 4,192,937, are also capped polyamines which can be used for producing the polyurethanes of the invention, for purposes of chain-extension of the prepolymers. When capped polyamines of this type are used, they are generally mixed with the prepolymers in the absence of water, and this mixture is then mixed with the dispersion water or with a portion of the dispersion water, so that the corresponding polyamines are liberated by hydrolysis.

It is preferable to use mixtures of di- and triamines, and it is particularly preferable to use mixtures of isophoronediamine (IPDA) and diethylenetriamine (DETA).

The polyurethanes preferably comprise, as monomers (d), from 1 to 30 mol %, particularly from 4 to 25 mol %, based on the total amount of components (b) and (d), of a polyamine having at least 2 amino groups reactive toward isocyanates. It is also possible to use, as monomers (d) for the same purpose, isocyanates of functionality higher than two. Examples of compounds available commercially are the isocyanurate or the biuret of hexamethylene diisocyanate.

Monomers (e) which are optionally used concomitantly are monoisocyanates, monoalcohols, and monoprimary and— secondary amines. The proportion of these is generally at most 10 mol %, based on the total molar amount of the monomers. Said monofunctional compounds usually bear other functional groups, examples being olefinic groups or carbonyl groups, and are used to introduce functional groups into the polyurethane, where these permit the dispersion and, respectively, the crosslinking or further polymer-analogous reaction of the polyurethane. Monomers that can be used for this purpose are those such as isopropenyl-$\alpha,\alpha$-dimethylbenzyl isocyanate (TMI) and esters of acrylic or methacrylic acid, e.g. hydroxyethyl acrylate or hydroxyethyl methacrylate.

Adhesive with particularly good property profile are especially obtained if monomers (a) used are in essence only aliphatic diisocyanates, cycloaliphatic diisocyanates, or araliphatic diisocyanates. In an excellent method, said monomer combination is complemented by, as component (c), alkali-metal salts of dihydroxy- or diaminomonocarboxylic acid; the Na salt is most suitable here.

The method for adjusting the molecular weight of the polyurethanes via selection of the proportions of the mutually reactive monomers, and also of the arithmetic average number of reactive functional groups per molecule, is well known in the polyurethane chemistry sector. The normal method selects components (a) to (e), and also the respective molar amounts of these, in such a way that the ratio A:B, where A is the molar amount of isocyanate groups and
B is the sum of the molar amount of the hydroxy groups and of the molar amount of the functional groups which can react with isocyanates in an addition reaction, is from 0.5:1 to 2:1, preferably from 0.8:1 to 1.5, particularly preferably from 0.9:1 to 1.2:1. The ratio A:B is very particularly preferably as close as possible to 1:1.

The monomers (a) to (e) used usually bear an average of from 1.5 to 2.5, preferably from 1.9 to 2.1, particularly preferably 2.0, isocyanate groups and, respectively, functional groups which can react with isocyanates in an addition reaction.

The polyaddition reaction of the structural components used to produce the polyurethane preferably takes place at reaction temperatures of up to 180° C., with preference up to 150° C., at atmospheric pressure or at autogenous pressure. The production of polyurethanes and, respectively, of aqueous polyurethane dispersions is known to the person skilled in the art. The polyurethanes preferably take the form of aqueous dispersion and are used in this form. The pH of the polymer dispersion is preferably adjusted to pH above 5, in particular to pH from 5.5 to 8.5.

The adhesive to be used in the invention comprises carboxylate groups and preferably other reactive groups, where these can enter into a crosslinking reaction with one another or with external crosslinking agents. The amount of said reactive groups preferably present is from 0.0001 to 0.5 mol/100 g of adhesive, particularly from 0.0005 to 0.5 mol/100 g of adhesive. Carboxy groups are also formed via hydrolysis reactions, and it is therefore also possible that crosslinking can occur without any initial content of carboxy groups in the polyurethane.

In one embodiment of the invention, the polyurethane dispersion adhesive comprises at least one external crosslinking agent. Examples of suitable crosslinking agents are polyisocyanates having at least two isocyanate groups, e.g. isocyanurates formed from diisocyanates, compounds having at least one carbodiimide group, chemically capped isocyanates, encapsulated isocyanates, encapsulated uretdiones, biurets, or allophanates. Aziridines, oxazolines, and epoxides are also suitable. The amount used of the external crosslinking agent is preferably from 0.5 to 10% by weight, based on the solids content of the dispersion. An external crosslinking agent is a compound which, prior to the crosslinking reaction, has not been bonded to the polyurethane but instead has been dispersed or dissolved in the polyurethane dispersion. However, it is also possible to use crosslinking agents which have been bonded to the polyurethane (internal crosslinking agents).

In the invention, the polyurethane dispersions of the invention are used in aqueous adhesive preparations for producing laminates, i.e. in aqueous lamination-adhesive preparations for the adhesive bonding of large-surface-area substrates; they are used in particular for producing composite foils.

The present invention therefore also provides a process for producing composite foils by using an aqueous adhesive preparation which comprises at least one polymer dispersion of the invention. The aqueous polymer dispersions here can be used as they stand or after further processing with conventional auxiliaries. Examples of conventional auxiliaries are wetting agents, thickeners, protective colloids, light stabilizers, biocides, antifoams, etc. The adhesive preparations of the invention do not require the addition of plasticizing resins (tackifiers) or of other plasticizers. In the process for producing composite foils, at least two substrates are adhesive-bonded to one another with use of the aqueous polymer dispersion. The substrates are large-surface-area, flexible components, of which at least one is, and preferably both are, (a) polymer foil(s).

In the process of the invention for producing composite foils, the polymer dispersion of the invention or a corresponding further-processed preparation is applied preferably using a layer thickness of from 0.1 to 20 g/m$^2$, particularly preferably from 1 to 7 g/m$^2$, to the substrates that are to be adhesive-bonding, for example via doctoring, spreading, etc. Conventional coating processes can be used, e.g. roller coating, reverse-roll coating, gravure-roll coating, reverse-gravure-roll coating, brush coating, bar coating, spray coating, airbrush coating, meniscus coating, curtain coating, or dip coating. After a short time for air-drying of the dispersion water (preferably after from 1 to 60 seconds), the coated substrate can then be laminated to a second substrate, and the temperature here can by way of example be from 20 to 200° C., preferably from 20 to 100° C., and the pressure here can by way of example be from 100 to 3000 kN/m$^2$, preferably from 300 to 2000 kN/m$^2$.

In one embodiment, the polymer dispersion of the invention is used as single-component composition, i.e. without additional crosslinking means, in particular without isocyanate crosslinking agent. However, the polymer dispersion of the invention can also be used as two-component adhesive, where a crosslinking component, e.g. a water-emulsifiable isocyanate, is added. At least one of the substrates can have been metalized or printed on the side coated with the adhesive. At least one of the substrates, preferably both substrates, is/are biodisintegratable.

It can be advantageous to apply the biodisintegratable polymer (the first substrate) to the second substrate by extrusion coating process. The abovementioned aqueous lamination adhesive preparation (polymer dispersion) is applied as intermediate layer. The advantage in the use of the lamination adhesive preparation in the extrusion coating process derives from the possibility of lowering the extrusion temperature. The mild conditions used save energy and guard against any decomposition of the biodisintegratable polymer.

For the purposes of the present invention, a substance or a substance mixture complies with the "biodisintegratable or degradable" feature when said substance or the substance mixture has a percentage degree of biodegradation of at least 90% to DIN EN 13432.

The biodegradation generally leads to decomposition of the polyester (mixtures) within an appropriate and demonstrable period of time. The degradation can take place enzymatically, hydrolytically, oxidatively, and/or via exposure to electromagnetic radiation, for example UV radiation, and is mostly predominantly a result of exposure to microorganisms, such as bacteria, yeasts, fungi, and algae. The biodegradability can by way of example be quantified by mixing polyester with compost and storing it for a particular time. By way of example, in DIN EN 13432, $CO_2$-free air is passed through ripened compost during the composting process, and the compost is subjected to a defined temperature profile. The biodegradability here is defined as a percentage degree of biodegradation by way of the ratio of the net amount of $CO_2$ released from the specimen (after subtraction of the amount of $CO_2$ released by the compost without specimen) to the maximum amount of $CO_2$ that can be released from the specimen (calculated from the carbon content of the specimen). Biodegradable polyester (mixtures) generally exhibit marked signs of degradation after just a few days of composting, examples being fungal growth, cracking, and perforation.

Other methods for determining biodegradability are described by way of example in ASTM D5338 and ASTM D6400-4.

Examples of suitable substrates are foils made of lignin, of starch, of cellulose materials, of polylactic acid (PLA), of polylactic acid stereocomplexes (PLLA-PDLA), of polyglycolic acid (PGA), of aliphatic polyesters, of aliphatic-aromatic copolyesters, and of polyhydroxyalkanoates, cellophane, polypropylene carbonate (PPC), and mixtures of the abovementioned materials. Examples of aliphatic polyesters are polybutylene succinate (PBS), polybutylene succinate-co-butylene adipate (PBSA), polybutylene succinate-co-butylene sebacate (PBSSe), polycaprolactone (PCL), and polypentadecanolide. Examples of aliphatic-aromatic copolyesters are polybutylene adipate-co-butyleneterephthalate (PBAT), polybutylene sebacate-co-butylene terephthalate (PBSeT), polybutylene azelate-co-butylene terephthalate (PBAzeT), polybutylene brassylate-co-butylene terephthalate (PBBrasT). Examples of particularly suitable materials are Ecoflex® foils, e.g. Ecoflex® F or Ecoflex® FS. Examples of polyhydroxyalkanoates are poly-3-hydroxybutyrate (PHB), poly-3-hydroxybutyrate-co-3-hydroxyvalerate (P(3HB)-co-P(3HV)), poly-3-hydroxybutyrate-co-4-hydroxybutyrate (P(3HB)-co-P(4HB)), poly-3-hydroxybutyrate-co-3-hydroxyhexanoate (P(3HB)-co-P(3HH)). Particularly suitable mixtures are mixtures of aliphatic-aromatic copolyesters with PLA (e.g. Ecovio® foils) or mixtures of aliphatic polyesters, aliphatic-aromatic copolyesters, or polyvinyl alcohol with starch (e.g. Mater-Bi® foils).

The foils can also be metal-coated, e.g. aluminum-coated (metalized) polymer foils (abbreviated to: metalized foils). The abovementioned foils can by way of example have been printed with printing inks. The material of the first substrate has preferably been selected from lignin, starch, cellulose materials, polylactic acid, polyglycolic acid, aliphatic polyesters, aliphatic-aromatic copolyesters, polyhydroxylkanoates, polypropylene carbonate, and mixtures of the abovementioned materials, and the material of the second substrate has preferably been selected from paper, lignin, starch, cellulose materials, polylactic acid, polyglycolic acid, aliphatic polyesters, aliphatic-aromatic copolyesters, polyhydroxyalkanoates, polypropylene carbonate, and mixtures of the abovementioned materials.

In one embodiment of the invention, the first foil and/or the second foil has been metalized or printed on the respective side which is coated with the polymer dispersion of the invention. The thickness of the substrate films can by way of example be from 5 to 100 µm, preferably from 5 to 40 µm.

Particular preference is given to composite foils where the material of the first substrate is paper and the material of the second substrate is polylactic acid or a mixture comprising polylactic acid and comprising an aliphatic-aromatic copolyester.

These composite foils can, as mentioned above, be produced via lamination processes or extrusion processes. WO 2010/034712 describes an advantageous extrusion process for paper coating, and biodisintegratable polymers preferred for this purpose, and said document is expressly incorporated herein by way of reference. The extrusion process in WO 2010/034712 is supplemented by the lamination adhesive layer of the invention between first and second substrate.

Dispersion coatings require no heating prior to application. The application technology is comparable with that for hot-melt adhesives, if sheet-like coatings are involved. The web speeds are very high: up to 3000 m/min. Dispersion coating processes can therefore also be carried out on line on paper-making machines.

In the case of thin layers, it is also possible to apply the biodisintegratable polymer in the form of hotmelt, to a certain extent in the form of a special case of the extrusion coating process or of the dispersion application process. Said process is described in Ullmann, TSE Troller Coating. The hotmelt adhesive (hotmelt) is pumped from a feed vessel preheated to about 150 to 200° C. into the nozzle through which the material is applied to the surface.

The extrusion coating process was developed in order to apply thin polymer layers to flexible substrates, such as paper, paperboard, or multilayer foils with metal layer, with high web speeds of from 100 to 600 m/min. The biodisintegratable polymers can be processed on existing extrusion-coating systems for polyethylene (J. Nentwig: Kunststofffolien [Plastics foils], Hanser Verlag, Munich 2006, p. 195; H. J. Saechtling: Kunststoff Taschenbuch [Plastics handbook], Hanser Verlag, Munich 2007, p. 256; C. Rauwendaal: Polymer Extrusion, Hanser Verlag, Munich 2004, p. 547).

"Paper products" are used as substrate. For the purposes of the present invention, the term "paper products" covers all types of paper and in particular paperboard.

Suitable fibers for producing said paper products are any of types customarily used, e.g. mechanical pulp, bleached and unbleached chemical pulp, paper stocks from any of the annual plants and wastepaper (including that in the form of broke, either coated or uncoated). Said fibers can be used either alone or in the form of any desired mixture of these to produce the pulps from which the paper products are produced. The term mechanical pulp covers, for example, groundwood, thermomechanical pulp (TMP), chemothermomechanical pulp (CTMP), pressure groundwood, semi-chemical pulp, high-yield chemical pulp, and refiner mechanical pulp (RMP). By way of example, sulfate pulps, sulfite pulps, and soda pulps are suitable chemical pulps. Examples of suitable annual plants for producing paper stocks are rice, wheat, sugarcane, and kenaf.

Amounts of from 0.01 to 3% by weight, preferably from 0.05 to 1% by weight, of size, in each case in terms of solids, based on dry paper substance, are usually added to the chemical pulps, and these vary with the desired degree of sizing of the papers to be finished. The paper can moreover comprise other substances, e.g. starch, pigments, dyes, optical brighteners, biocides, paper strength agents, fixing agents, antifoams, retention aids, and/or drainage aids.

The kraft liners (composite foils) produced preferably have the following structure:

i) paper of grammage from 30 to 600 g/m², preferably from 40 to 400 g/m², and with particular preference from 50 to 150 g/m², ii) a biodisintegratable polymer layer of thickness from 1 to 100 µm, preferably from 5 to 80 µm, and with particular preference from 10 to 60 µm.

A very wide variety of materials can be used for the paper layers, e.g. white or brown kraft liner, pulp, wastepaper, corrugated material, or screenings.

The total thickness of the paper-foil composite is generally from 31 to 1000 g/m². Lamination can preferably be used to produce a 80-500 µm paper-foil composite, and extrusion coating can particularly preferably be used to produce a 50-300 µm paper-foil composite.

It is not essential to surface-coat the foil substrates prior to the coating with a polymer dispersion of the invention. However, better results can be obtained if the surface of the foil substrates is modified prior to the coating process. Conventional surface treatments can be used here, examples being corona treatment, to reinforce the adhesive effect. The corona treatment or other surface treatments are carried out to the extent required for sufficient wettability with the coating composition. A corona treatment using about 10 watts per square meter and minute is usually sufficient for said purpose. As an alternative or in addition it is also optionally possible to use primer or intermediate layers between foil substrate and adhesive coating. The composite foils can also have other, additional functional layers, e.g. barrier layers, print layers, color layers or lacquer layers, or protective layers. The location of the functional layers here can be external, i.e. on that side of the foil substrate that faces away from the adhesive-coated side, or internal, between foil substrate and adhesive layer.

Within the composite foil of the invention, the second substrate (e.g. paper) has protection from mineral oil and other types of oil, and from fat, and moisture, because the first substrate (e.g. biodisintegratable polymer foil) exerts an appropriate barrier effect. On the other hand, when the composite foils are used for food packaging, the foods have protection from the mineral oils and mineral substances present by way of example in the wastepaper since the first substrate (e.g. biodisintegratable polymer foil) exerts said barrier effect. Because moreover the composite foil can be welded to itself and also to paper, paperboard, and metal, it permits production of, for example, coffee cups, drinks cartons, or cartons for frozen products.

The composite foil is particularly suitable for producing paper bags for dry foods, e.g. coffee, tea, soup powder, sauce powder; for liquids, e.g. cosmetics, cleaning compositions, drinks; tubular laminates; paper carrier bags, paper laminates and coextrudates for ice-cream, confectionery (e.g. chocolate bars and muesli bars) and paper adhesive tape; paper cups, yoghurt pots; ready-meal trays; wound paperboard containers (cans, drums), wet-strength cartons for outer packaging (wine bottles, food); fruit boxes made of coated paperboard; fast-food plates; clamp shells; drinks cartons and cartons for liquids, such as detergents and cleaning compositions, cartons for frozen products, ice packaging (e.g. ice cups, wrapping material for conical ice-cream wafers); paper labels; flower-pots and plant pots.

The composite foils produced in the invention are particularly suitable for producing flexible packaging, in particular for food packaging.

An advantage of the invention is that the polyurethane adhesive dispersions used in the invention can provide good adhesive bonding of various substrates to one another, giving the adhesive-bonded composite high strength. The composite foils produced in the invention moreover feature good biodegradability.

EXAMPLES

Example 1

996.77 g of a polyesterdiol made of adipic acid and 1,4-butanediol (OH number=43.9) and 0.13 g of tetrabutyl titanate (TBOT) are dissolved in 260 g of acetone and heated to 60° C., and reacted at 65° C. for 1 h with 46.2 g of tolylene diisocyanate; the mixture is then further reacted at 66° C. for 3.5 h with 44.6 g of hexamethylene diisocyanate. The mixture is then diluted with 1040 g of acetone and cooled to 50° C. NCO content is then 0.5%. 51.2 g of a 40% strength aqueous solution of the sodium salt of aminoethylaminopropionic acid are then used for 15 minutes for chain-extension, and the mixture is dispersed using 1638 g of deionized water. The acetone is removed by distillation at temperatures up to 43° C. in vacuo, and solids content is adjusted to 40%.

Analysis values: LD: 87.5; viscosity: 32 mPas; K value: 51; pH: 8.0

Example 2

400 g of a polyesterdiol made of a 1:1 mixture of adipic acid and isophthalic acid and 1,6-hexanediol (OH number: 56) are stirred with 20.1 g of dimethylolpropionic acid and 150 g of acetone at 40° C., and reacted for 3 h at an external temperature of 90° C. with 112 g of hexamethylene diisocyanate. The mixture is then diluted with 550 g of acetone and cooled to 30° C. NCO content is 2%. 12 g of triethylamine are used for neutralization and 34 g of isophoronediamine are used for chain-extension. The mixture is then dispersed using 650 g of deionized water and then immediately crosslinked by 8.2 g of diethylenetriamine dissolved in 100 g of deionized water. The acetone is removed by distillation in vacuo at temperatures up to 42° C.

Analysis values: solids content 44%; LD: 80; viscosity: 21 mPas

Example 3

Comparative Example, Not Degradable 801 g of polypropylene oxide diol (OH number 56) are reacted for 6 h at 100° C. with 64.4 g of dimethylolpropionic acid and 153.3 g of tolylene diisocyanate in 70 g of acetone. The mixture is then diluted with 800 g of acetone and cooled to 30° C. NCO content is <0.2%. 8.64 g of NaOH (50% strength) mixed with 50 g of deionized water are used for neutralization, and the mixture is dispersed using 650 g of deionized water. The acetone is removed by distillation in vacuo at temperatures up to 42° C., and the solids content of the dispersion is adjusted to 60%.

Analysis values: LD: 42; viscosity: 185 mPas; K value: 42; pH: 6.4

Example 4

Comparison in Accordance With WO 96/35733, Example 3

510 g of a polyesterdiol made of adipic acid and 1,6-hexanediol/neopentyl glycol 2:1 (OH number=57) are dewatered in vacuo at an external temperature of 120° C., and 0.6 g of benzoyl chloride and 90.3 g of hexamethylene diisocyanate are added under nitrogen, and the mixture is reacted at an internal temperature of 115° C. for 30 minutes. 1500 g of acetone are used for dilution, with cooling to 50° C. NCO content is then 1%. A mixture made of 29.08 g of a 50% strength aqueous solution of the sodium salt of aminoethylaminoethanesulfonic acid, 4.5 g of ethylenediamine, and 60 g of deionized water is used for 15 minutes for chain-extension, and a dispersion is produced by using 900 g of deionized water for 15 minutes. The acetone is removed by distillation in vacuo at temperatures up to 51° C.

Analysis values: solids content: 46%; LD: 44; viscosity 16.4 mPas; K value: 77; pH 6.4

Example 5

With Crosslinking Agent

An amount of 3% by weight (corresponding to 7.5% by weight of solids used) of an isocyanurate based on hexamethylene diisocyanate was added to the dispersion of Example 1.

Composting Test

Foils were produced from the dispersions of inventive Examples 1 and 4 in glass dishes by drying at 60° C. The foils have a diameter of 4.5 cm and a thickness of 1 mm. The foils were interred in compost and incubated at 58° C. The foils were visually assessed and weighed at regular intervals.

Start:
Example 1: weight: 100%
Example 4: weight: 100%
After 3 Weeks:
Example 1: weight: about 90%, coarse, uneven surface, almost perforated, markedly degraded
Example 4: weight: about 96%; surface roughened, very slightly degraded
After 6 Weeks:
Example 1: weight: about 70%, very uneven surface with many perforations of size up to 5 mm; very markedly degraded
Example 4: weight: about 93%; no visual difference from the assessment after 3 weeks Biodegradability of Polyurethane Dispersions:

The biodegradability test was carried out for the aqueous dispersions of Examples 1, 2, 3, and 5 by analyzing the carbon dioxide liberated in accordance with ISO 14855 (2005). The degree of biodegradation measured in percent is defined as the ratio of gaseous carbon in the form of $CO_2$ released to the total carbon content of the material used. Table 1 collates the results.

TABLE 1

Biodegradation of polyurethane dispersions

| Example | Degradation [%] after 20 days | Degradation [%] after 28 days |
|---|---|---|
| Example 1 | 70 | 79 |
| Example 2 | 34 | 39 |
| Example 3 | 0 | 0 |
| Example 5 | 90 | 95 |

Disintegration of Composite Foils:

In accordance with the standard EN 13432 (2000), a packaging material has adequate degradability by disintegration if after aerobic composting for at most a period of 12 weeks the dry weight found for the test material is at most 10% of the original dry weight in a >2 mm sieve fraction.

A composite foil was produced by coating a foil made of polylactic acid with the polyurethane dispersion of Example 1 and adhesive-bonding it to a second foil made of polylactic acid. The total thickness of the composite foil was 49 micrometers. Disintegration was determined in accordance with EN 13432 (2000).

The residual amount of the composite foil found after a period of at most 12 weeks was 8.2%, for the 2 mm sieve fraction. The foil therefore complies with the conditions of the EN 13432 standard in respect of disintegration by composting, and it therefore has good degradability.

The invention claimed is:

1. A biodistintegratable composite foil produced by a method, the method comprising:
adhesive-bonding at least one first substrate to at least one second substrate with an adhesive comprising a biodegradable aqueous dispersed polyurethane, thereby forming a biodisintegratable composite foil,
wherein at least one of the at least one first substrate and the at least one second substrate is a biodisintegratable polymer foil, and
at least 60% by weight of the biodegradable aqueous dispersed polyurethane comprises:
(a) a diisocyanate;
(b) a polyesterdiol; and
(c) a bifunctional carboxylic acid selected from the group consisting of a dihydroxycarboxylic acid and a diaminocarboxylic acid,
wherein said biodegradable aqueous dispersed polyurethane exhibits a ratio of gaseous carbon liberated therefrom in the form of $CO_2$ to a total carbon content of a material of at least 30% after 20 days, and
wherein at most 10% of an original dry weight of said biodisintegratable composite foil is found to be present after aerobic composting for a period of at most 12 weeks in a sieve fraction >2 mm.

2. The biodistintegratable composite foil of claim 1, wherein at least 80% by weight of the biodegradable aqueous dispersed polyurethane is the polyesterdiol.

3. The biodistintegratable composite foil of claim 1, wherein the polyesterdiol comprises from 10 to 100 mol % of a polyesterdiol with a molar mass of from 500 to 5000 g/mol, based on a total amount of the polyesterdiol, and from 0 to 90 mol % of a polyesterdiol having a molar mass of from 60 to 500 g/mol, based on a total amount of the polyesterdiol.

4. The biodistintegratable composite foil of claim 3,
wherein the biodegradable aqueous dispersed polyurethane further comprises:
a polyfunctional compound different from monomers a) to c), and
the polyfunctional compound has at least one reactive group selected from the group consisting of an alcoholic hydroxy group, a primary or secondary amino group, and an isocyanate group.

5. The biodistintegratable composite foil of claim 4,
wherein the biodegradable aqueous dispersed polyurethane further comprises:
a monofunctional compound differs from monomers a) to c), and
the monofunctional compound has at least one reactive group selected from the group consisting of an alcoholic hydroxy group, a primary or secondary amino group, and an isocyanate group.

6. The biodistintegratable composite foil of claim 3,
wherein the biodegradable aqueous dispersed polyurethane further comprises:
a monofunctional compound differs from monomers a) to c), and
the monofunctional compound has at least one reactive group selected from the group consisting of an alcoholic hydroxy group, a primary or secondary amino group, and an isocyanate group.

7. The biodistintegratable composite foil of claim 1,
wherein the adhesive further comprises an external crosslinking agent.

8. The biodistintegratable composite foil of claim 7,
wherein the external crosslinking agent is at least one selected from the group consisting of an isocyanurate formed from a diisocyanate and having at least two isocyanate groups, a compound having at least one carbodiimide group, a chemically capped isocyanate, an encapsulated isocyanate, an encapsulated uretdione, a biuret, an allophanate, an aziridine, an oxazoline, and an epoxide.

9. A composite foil produced by a method, comprising:
applying a biodisintegratable polymer as at least one first substrate, via extrusion coating to at least one second substrate, and
applying, as an intermediate layer, an adhesive comprising a biodegradable aqueous dispersed polyurethane,
wherein at least 60% by weight of the biodegradable aqueous dispersed polyurethane comprises
(a) a diisocyanate;
(b) a polyesterdiol; and
(c) a bifunctional carboxylic acid selected from the group consisting of a dihydroxycarboxylic acid and a diaminocarboxylic acid,
wherein said biodegradable aqueous dispersed polyurethane exhibits a ratio of gaseous carbon liberated therefrom in the form of $CO_2$ to a total carbon content of a material of at least 30% after 20 days, and
wherein at most 10% of an original dry weight of said biodisintegratable composite foil is found to be present after aerobic composting for a period of at most 12 weeks in a sieve fraction >2 mm.

10. The composite foil of claim 9,
wherein at least 80% by weight of the biodegradable aqueous dispersed polyurethane is the polyesterdiol.

11. The composite foil of claim 9,
wherein the polyesterdiol comprises from 10 to 100 mol % of a polyesterdiol with a molar mass of from 500 to 5000 g/mol, based on a total amount of the polyesterdiol, and from 0 to 90 mol % of a polyesterdiol having a molar mass of from 60 to 500 g/mol, based on a total amount of the polyesterdiol.

12. The composite foil of claim 11,
wherein the biodegradable aqueous dispersed polyurethane further comprises:
a polyfunctional compound different from monomers a) to c), and
the polyfunctional compound has at least one reactive group selected from the group consisting of an alcoholic hydroxy group, a primary or secondary amino group, and an isocyanate group.

13. The composite foil of claim 12,
wherein the biodegradable aqueous dispersed polyurethane further comprises:
a monofunctional compound differs from monomers a) to c), and
the monofunctional compound has at least one reactive group selected from the group consisting of an alcoholic hydroxy group, a primary or secondary amino group, and an isocyanate group.

14. The composite foil of claim 11,
wherein the biodegradable aqueous dispersed polyurethane further comprises:
a monofunctional compound differs from monomers a) to c), and
the monofunctional compound has at least one reactive group selected from the group consisting of an alcoholic hydroxy group, a primary or secondary amino group, and an isocyanate group.

15. The composite foil of claim 9,
wherein the adhesive further comprises an external crosslinking agent.

16. The composite foil of claim 15,
wherein the external crosslinking agent is at least one selected from the group consisting of an isocyanurate formed from a diisocyanate and having at least two isocyanate groups, a compound having at least one carbodiimide group, a chemically capped isocyanate, an encapsulated isocyanate, an encapsulated uretdione, a biuret, an allophanate, an aziridine, an oxazoline, and an epoxide.

* * * * *